United States Patent
Weber et al.

(10) Patent No.: US 7,484,162 B2
(45) Date of Patent: Jan. 27, 2009

(54) METHOD AND APPARATUS FOR MONITORING AN ELECTRONIC CONTROL SYSTEM

(75) Inventors: Jochen Weber, Markgroeningen (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 10/544,560

(22) PCT Filed: Feb. 9, 2004

(86) PCT No.: PCT/DE2004/000330

§ 371 (c)(1),
(2), (4) Date: May 18, 2006

(87) PCT Pub. No.: WO2004/070487

PCT Pub. Date: Aug. 19, 2004

(65) Prior Publication Data

US 2007/0033492 A1    Feb. 8, 2007

(30) Foreign Application Priority Data

Feb. 7, 2003   (DE) ................................ 103 05 008

(51) Int. Cl.
*G11C 29/00* (2006.01)

(52) U.S. Cl. ..................................... 714/767

(58) Field of Classification Search ............... 714/776, 714/746, 763, 767
See application file for complete search history.

(56) References Cited

U.S. PATENT DOCUMENTS

| | | | | |
|---|---|---|---|---|
| 4,531,213 A | * | 7/1985 | Scheuneman | 714/703 |
| 6,101,614 A | | 8/2000 | Gonzales et al. | 714/6 |
| 6,279,128 B1 | | 8/2001 | Arnold et al. | 714/49 |
| 6,438,056 B2 | | 8/2002 | Aue | |
| 6,697,992 B2 | * | 2/2004 | Ito et al. | 714/763 |

FOREIGN PATENT DOCUMENTS

| | | |
|---|---|---|
| DE | 38 33 713 | 4/1989 |
| DE | 199 64 012 | 7/2001 |

* cited by examiner

*Primary Examiner*—Shelly A Chase
(74) *Attorney, Agent, or Firm*—Kenyon & Kenyon LLP

(57) ABSTRACT

A method and apparatus for monitoring an electronic control system, where code of a memory is, in a context of ongoing instruction accesses, transferable via a word line out of the memory to a control unit having a specific word width encompassing code of a plurality of memory cells of the memory and where an additional datum is created in each case for the code of a word width and is storable in the memory, may include an arrangement that, outside the ongoing instruction accesses, checks an entire code of the memory by selecting for each word width a single memory cell to thereby activate a complete word line, that creates a check datum from code of the complete word line, and that compares the check datum with the stored additional datum.

18 Claims, 3 Drawing Sheets

METHOD AND APPARATUS FOR MONITORING AN ELECTRONIC CONTROL SYSTEM

FIELD OF THE INVENTION

The present invention relates to a method and an apparatus for monitoring an electronic control system, control commands and/or data, in particular constants, being stored as code in at least one memory; the code, in particular the data, being transferred, in a context of ongoing instruction accesses, via a word line, in particular a data bus, out of the at least one memory to a control unit having a specific word width, in particular to a processor, in order to control operating sequences.

BACKGROUND INFORMATION

Methods for monitoring electronic control systems, based on the fact that a checksum is cyclically calculated over the entire code region or a portion thereof, are conventional. These are intended to detect when the code has been modified, whether by tuning or by charge loss in the memory element. The checksum calculation for manipulation or data loss should be carried out at startup of the system in order to achieve the greatest possible reliability. This is not feasible, however, because of the long times resulting from a complete checksum calculation over code from 100 KB to several megabytes, since the starting behavior of the system would thereby be slowed down and the customer would perceive this as a drawback.

In a context of ongoing instruction accesses (i.e., during operation), a method expressed by hardware is known for preventing data loss with regard to the problem of charge loss of flash memory elements. In this method with the corresponding hardware, also called error check and correction (ECC), not only are memory cells present that are necessary for the storage of information, i.e., for control commands and/or data (the actual code), but a number of memory cells having an additional datum, with which a determination can be made as to whether the information in the cells for information storage has changed, are additionally present. This is implemented in hardware in a context of ongoing instruction access, i.e., during operation. Hardware of this kind is described, for example, in German Patent No. DE 38 33 713 A1. As the name itself suggests, these additional data in some cases also make possible a correction of corrupt data. With the aforesaid method, however, the corresponding data are checked during ongoing operation, i.e., in a context of ongoing instruction accesses, so that those parts of the data or of the memory that are addressed less frequently or not at all by ongoing instruction accesses are checked less frequently or not at all. In the context of the aforesaid German Patent, the conventional method therefore does not guarantee regular monitoring or checking of all the memory cells of a memory.

Also known is a property of modern flash memories called "margin read." This function, described in German Patent Application No. DE 199 64 012 A1, ascertains whether the information in the memory cells is still sufficient even in normal mode (i.e., in normal operation) to permit error-free functioning of the control system. For that purpose, the memory cells are read out (or the cell current is measured) not at the normal bit line load but at an elevated load. If the cell charge is still sufficient, the information is read out correctly. If not, incorrect information is read out. By reading the information again without applying the elevated load and comparing the read-out values, it is possible to ascertain whether the charge is still sufficient. Reading of the information is always associated here with a checksum calculation, both for reading with margin read and for reading without margin read. If the checksums of the two operations are identical, it can be assumed that sufficient charge from the memory cells is present. This means, however, that here again a time-consuming checksum calculation must be carried out as already indicated above, with the aforementioned disadvantages.

SUMMARY

An object of the present invention resulting therefrom is that of making available a method and an apparatus with which cyclic monitoring or checking of all memory cells is possible, by shortening the time required for checking.

The example method described below makes possible monitoring or checking of all memory cells in cyclical and almost delay-free fashion, in particular prior to starting.

The present invention relates to a method and an apparatus for monitoring an electronic control system, control commands and/or data being stored as code in at least one memory. The code is transferred, in a context of ongoing instruction accesses, via a word line out of the at least one memory to a control device having a specific word width, in particular to a processor, in order to control operating sequences. The word width encompasses the code of a plurality of memory cells of the memory, and an additional datum is created in each case for the code of a word width and is stored in the memory. The entire code of the at least one memory is checked, outside the ongoing instruction accesses, by the fact that for each word width exactly one memory cell is selected and the complete word line is thereby activated. A check datum is created from the code of the complete onboard line and the check datum is compared with the stored additional datum.

According to an example embodiment, a method and an apparatus are provided for monitoring an electronic control system such that provision is made for the complete data or code of at least one memory to be read sequentially into the ECC unit, which can be filled very rapidly from the memory, and automatically checked there, with no need to transfer the complete data or code in time-consuming fashion to a processor. The ECC check width encompasses the data of a plurality of memory cells of the memory and is a multiple of the read word width of the processor, and an additional datum is created in each case for the data of a ECC check width and is stored in the memory. The entire code/data region of the at least one memory therefore is checked, outside the ongoing instruction accesses, by the fact that for each request by the processor for the contents of a single memory cell, the ECC unit is filled from the memory to the entire ECC check width including the additional datum. A check datum is created from the data of the complete ECC check width and the check datum is automatically compared, in the ECC unit, with the stored additional datum.

This advantageously makes possible an evaluation of the correctness of the entire memory contents before the engine is started, in particular in a motor vehicle, since the time necessary therefor has been substantially reduced. Usefully, in a specific example embodiment, a present charge state is additionally ascertained for the selected memory cell and/or the selected memory, and that state is compared with a definable charge threshold, or a modified charge threshold is stipulated for the selected memory/memory cell in the context of the readout of data and check data by modifying the bit line load. In other words, for the selected memory cell a present charge state is additionally ascertained or the data are read out with a modified threshold, and the ECC unit completely checks the correctness of the data with no need to transfer to the processor all the data to be checked. By additionally using the aforementioned margin read described above in the context of the method according to the present invention, conclusions can then additionally be drawn, without further time expenditure, as to future incorrect information in the memory, since in the event of charge loss in the memory, the data or code and the additional data for each ECC check width are detected as inconsistency in the ECC unit; this is not possible with the plain checksum method. If the charge state of the cells is incorrect, startup can be prevented and safety-critical states resulting from faulty memory contents can thus be avoided. This means that with the method and the apparatus according to the present invention, generally no comparison of the data or code needs to take place on the processor, since the comparison with the additional datum is already taking place in the ECC unit.

It is thus advantageously possible for no checking of the data to be performed on the processor itself, but instead for that checking to take place directly in the hardware of the ECC unit, with no need to transfer all the data via the data bus to the processor. It is furthermore advantageous if, in a particular embodiment, the processor executes the check code not from the memory that is to be checked, but from a different fast memory, in particular from a code cache or a separate code RAM.

It is additionally advantageous that selection of the memory cell of the respective word width is accomplished by repeatedly setting an increment proceeding from a start address of a first memory cell, each further memory cell being selected at the spacing of the increment. The result, in a particular expression, is a method such that the processor requests only the data of a selection of individual memory cells and not all the data of the memory, and proceeding from a start address of a first memory cell, all further selections are made by repeated addition of an increment to the start address at the spacing of the ECC check width. Here again, this means that with the method and the apparatus according to an example embodiment of the present invention, essentially no comparison of the data or the code needs to take place on the processor, since the comparison with the additional datum is already taking place in the ECC unit. In addition, because of the increment that is created, the processor needs to request only the data of individual memory cells with an increment at the spacing of the ECC check width, and not all the data of the memory, since the remaining ones are automatically transferred, along with the ones requested, from the memory into the ECC unit and checked. Proceeding from a start address of a first memory cell, it is therefore necessary in each case to request only one memory cell for each ECC check width; the increment for access to each further memory cell corresponds to the ECC check width.

Advantageously, in the event the data of the code or of the check datum are not equal to the additional datum, an interrupt request is signaled by the ECC unit to the processor and a fault is indicated.

It is additionally advantageous if fault detected in this comparison is immediately corrected, so that the electronic control system can continue to operate despite the faulty data or code.

Advantageously, when margin read is used, i.e., when the present charge state reaches or falls below the definable charge threshold, a refresh of the charge state of the respective memory cell or of all the memory cells of the corresponding word line or of all the memory cells of the memory is carried out, since the correct information can still be created either by way of the ECC or by modifying the definable charge threshold or by a combination of both methods. With this charge comparison, conclusions can also be drawn as to a future fault, as mentioned above; and a capability for indicating a further fault exists simultaneously with the capability of preventing that future fault.

It is additionally advantageous if the processor executes the check code not from the memory that is to be checked but from a different fast memory, in particular from a cache or a separate code RAM. This ensures that on the one hand only the intended data are checked in the ECC unit, and on the other hand that, in particular when margin read is used, execution of the check code is guaranteed even if the defined charge thresholds are no longer being reached, and an incorrect code might therefore be sent to the processor if the latter were to obtain its instructions from the same memory.

BRIEF DESCRIPTION OF THE DRAWINGS

The present invention is explained below in more detail with reference to the figures.

DETAILED DESCRIPTION OF EXAMPLE EMBODIMENTS

Figure 1:
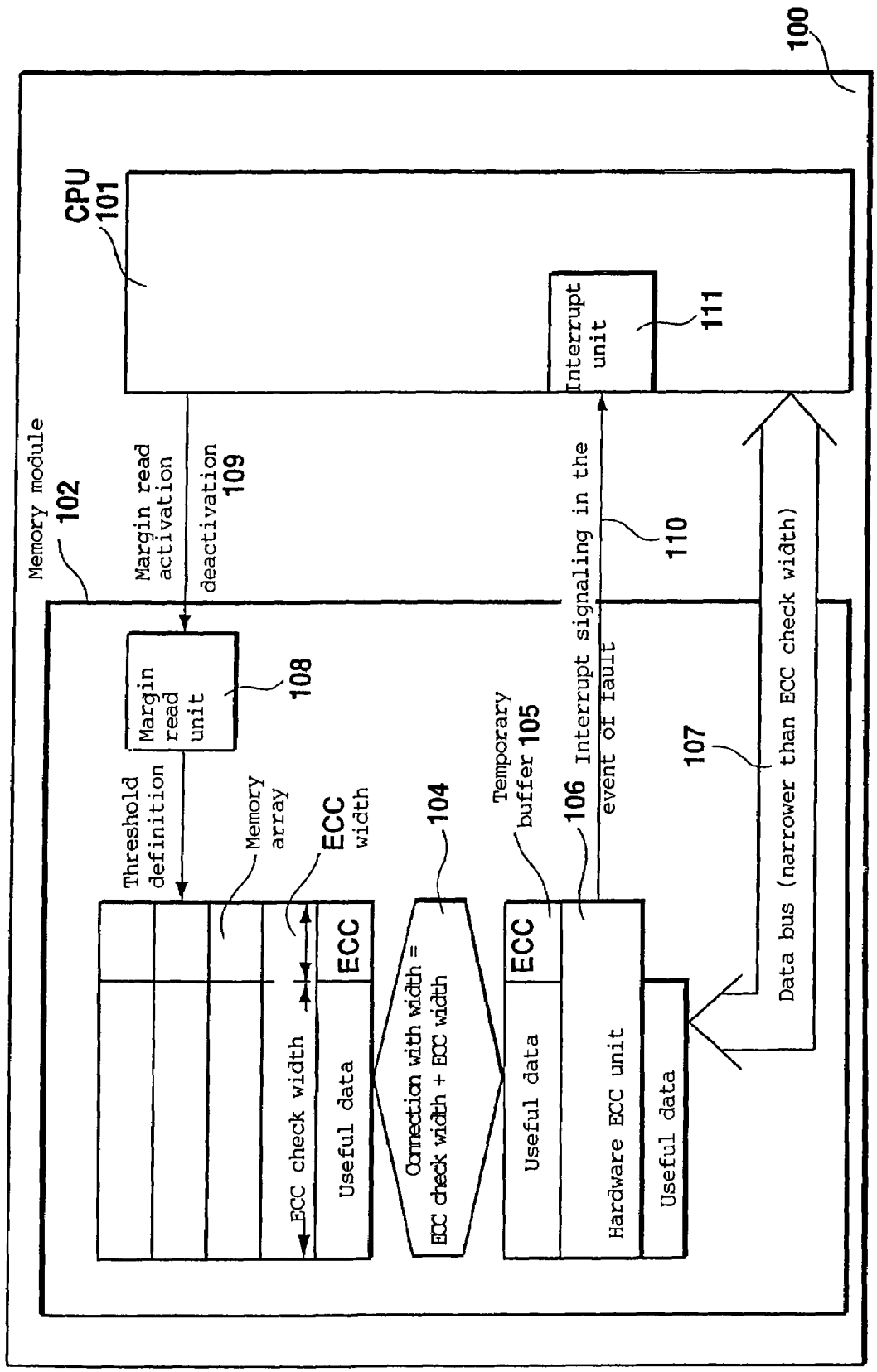
FIG. 1 shows a control device having hardware according to an example embodiment of the present invention.

FIG. 1 shows an electronic control system or control device 100 which contains a memory 102 and a control unit 101, in particular a processor. The control unit and the memory with ECC hardware are interconnected via a bidirectional data bus 107. The numbers 104, 105, and 106 designate first means that carry out the comparison of the check datum with the additional datum, i.e., that largely correspond to the ECC hardware. The number 108 represents charge check means with which margin read can be activated, i.e., with which the charge state of the memory cell can be checked. The number 110 indicates interrupt means that trigger a fault reaction upon detection of a fault, in particular an interrupt. The interrupt processing unit in the processor is labeled 111. To elucidate the individual aspects of the present invention, all the means are depicted separately. These means can, however, also be present in one block, i.e., in integrated fashion, specifically in the processor or in memory unit 102, but also externally and merely connected to the processor and the memory. Faults can be furthermore be displayed, for example, by way of a display means that is connected via a connection, in particular, to the processor.

When a datum is read, in particular a memory cell of memory array 103, temporary buffer 105 of ECC unit 106 is loaded out of the memory as data, via the fast bidirectional connection 104, at the full ECC check data width including the additional data, for example 64 bits of data+8 bits of additional data, and the error check and correction function is executed on the data at the ECC check data width by the ECC hardware (in this case 106). If the ECC identifies a fault, an interrupt is triggered at the CPU, i.e., at interrupt processing unit 111 or processor 101 as a whole.

Figure 2:
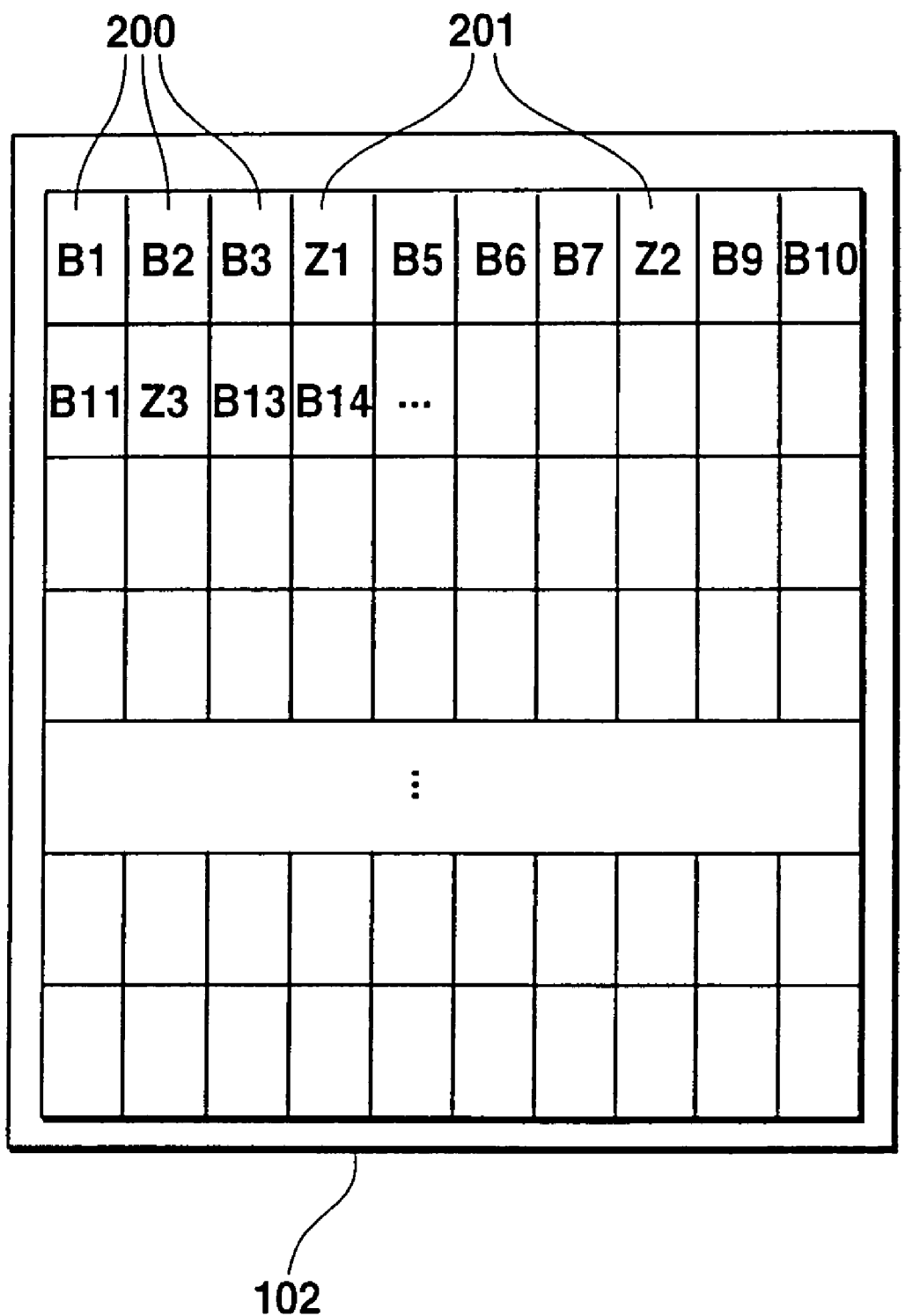
FIG. 2 depicts a memory according to an example embodiment of the present invention having individual memory.

To explain the example method, the memory is depicted in further detail in FIG. 2. The memory contains memory cells 200 and 201. Memory cells 200 contain control commands and/or data as code, i.e., as binary information, for example always in 8-bit fashion as bytes B1, B2, B3, B5, etc. Between them, in memory cells 201 in this specific example, are stored the aforesaid additional data Z1, Z2, Z3, etc. When a memory cell is activated, for example B1, a data word at the entire word width—32 bits, or 4 bytes, in our example—is read out via connecting line 104. If the additional data and the data or code are located in the same memory, then in this manner, for example at 32 bits, the information from memory cells B1, B2, B3 and the additional datum memory cell Z1 are read out at four times 8 bits, in a single transfer in the case of a 32-bit connecting line. The aforesaid ECC hardware 106 can then perform the fault check and any correction in a single access over the entire ECC check width in ECC temporary buffer 105. The additional datum, in this case, e.g., Z1, can be created and evaluated using a variety of methods, with the presupposition of a corresponding ECC hardware article 106 corresponding to the respective method. In addition to the cyclic redundancy check (CRC), any other relevant method, for example Hemming code, Berger code, summing, in particular parity bit creation, etc. is possible, and provided according to the present invention. Depending on the method selected, the additional datum can encompass one or more memory cells. Similarly, the additional datum need not always (as here) follow the respective data memory cells, but can also be stored in a separate memory region of memory array 103, but also in a separate memory. All that is important is a direct association of the corresponding memory cells with the data to be checked and the corresponding additional datum. It would then be possible, unlike in the example where the additional datum is contained in the same word width transferred from the memory array, for not only the normal word width but also the additional datum to be conveyed via separate lines to the ECC hardware. What is significant here is that a complete checksum calculation in the processor, meaning acquisition of each individual memory cell, is not necessary, but instead that a complete test becomes possible by way of a single access to the ECC hardware, with no need to transfer to the processor all the data to be checked. The 32-bit word width is selected arbitrarily here; any other word width, such as 8, 16, or 24 bits or another individually selected word width, can also be used. If, for example, a 64-bit ECC check width is used, 64 bits of data and the 8 bits for the ECC are read simultaneously, and the ECC check is carried out as soon as the processor requests even a portion thereof. As a result, the read request from the processor, for example, 16 or 32 bits of a memory region, is sufficient to evaluate the correctness of a 64-bit group. The processor itself can ignore the supplied data without further comparison. The reason this is possible is that if incorrect data were read, an interrupt would be triggered by the ECC unit. Thus, even 256-bit information memories, i.e., data, and 32 bits of ECC information could be checkable in one step.

The advantage of the aforesaid method is clear: because a checksum need not be calculated separately (as in the existing art) in the processor, the read accesses to the memory can follow one another immediately; for the example just cited, this would mean on the one hand that the following time would be required using the CRC method: three cycles to read 32 bits, then adding the 32 bits to the checksum (which requires another three cycles), and then evaluating everything twice at 64 bits. The consequence would be that a minimum time of $(3+3)\times2=12$ cycles would be required in order to calculate the checksum. For the method according to the present invention, which is presented once again in detail in FIG. 3, only the first three cycles would be needed (to read the 32 bits). The result, in the example indicated, is a decrease of at least 75%.

The usefulness of the ECC for rapid examination of the entire memory contents is evident, as compared with methods based on evaluation of the data from each memory location or each memory cell by an execution unit.

Figure 3A:
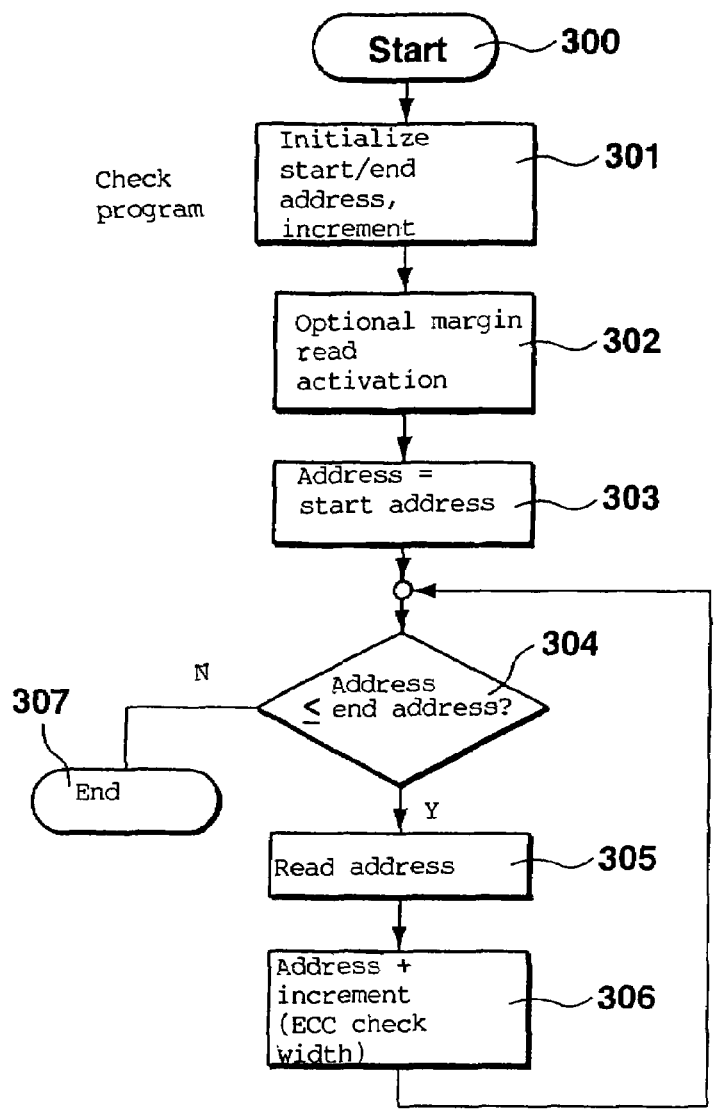
FIG. 3 including FIGS. 3a and 3b, elucidates the present invention with reference to a specific exemplifying embodiment in the form of a flow chart.
Figure 3B:
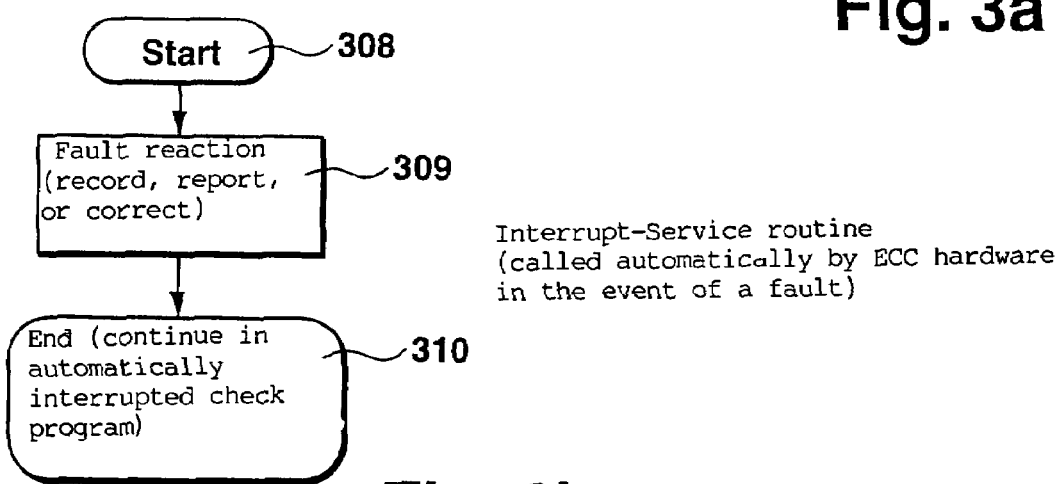

The method itself is depicted in detail once again in FIG. 3, which includes FIGS. 3a and 3b. Block 300 in FIG. 3a depicts the start of the method. Initialization takes place in block 301, meaning that, for example, the start address and end address are set and the aforementioned increment is stipulated. The optimum increment is defined by the ECC check width of the ECC hardware, since a complete ECC check width is always loaded and evaluated by the ECC, but this is in every case a multiple of the read word width that is transferred to the processor.

In block 302 the margin read, i.e., the charge threshold method, is optionally activated. For this, the memory cells, in particular the selected memory cells, are read out, or the cell current is measured, not at the normal bit line load but at an elevated load. If the cells' charge is still sufficient, the information is read out correctly. If not, incorrect information is read out; this is automatically noted by the ECC unit and signaled. Possible activation or connection of this optional additional method, i.e., the margin read, can be carried out in block 302.

In block 303 the address is set to equal the start address. In block 304 a query is made as to whether the address being read is less than or equal to the previously set end address. If so, in block 305 the contents of the address are requested from the memory. Concurrently, in the ECC unit the request is then made for data for the entire ECC check width from the memory, optionally with margin read activated; this has the advantage that faults occurring in the future can also be detected.

In the event of a fault, the ECC unit interrupts the check program on the processor and, with the aid of the interrupt unit, activates the interrupt service routine starting at block 308 in FIG. 3b. In block 309 the fault can be displayed, reported, or corrected. Here, as well, a distinction can be made as to whether the fault already exists or will occur in the future. Different fault reactions can occur as a function thereof. If the present charge state reaches or falls below the definable charge threshold in a margin read, for example, what occurs as a correction is a refresh of the charge state of the particular memory cell or all the memory cells of a word line or all the memory cells of the entire memory. That fault can then be displayed, for example, via a display unit. Likewise, however, a detected fault can also be stored in a fault memory and read out later. As a reaction to such a fault, correction of the fault can take place, or execution can switch over to an emergency mode, or the fault can be displayed and the startup operation can be canceled, depending on how critical the fault is found to be. In other words, different priority classes can be assigned to the faults, either as defined by a table or depending on the nature and number of the fault detection mechanisms—i.e., the ECC check and margin read, only ECC check, or only margin read—with which the fault was detected.

Once fault processing is complete, the interrupt service routine in block 310 is terminated and processing of the interrupted check program is continued in block 306 by replacing the present address with the address plus the increment. With no further processing of the supplied data, execution then jumps back to block 304. There the address incremented by the increment value is checked to determine whether that address is less than or equal to the end address. If that is still the case, execution remains in the loop just discussed through blocks 305, 306, and 304; otherwise, if the end address has been reached, the method ends at block 307.

What occurs in accordance with the aforesaid method is therefore firstly that by way of the apparatus described, the electronic control system is monitored by the fact that means are included which, outside the ongoing instruction accesses, check all the data of the at least one memory by the fact that for each ECC check width, exactly one memory cell is requested by the processor, and the means as a result load the complete data for each ECC check width, including the additional data, into the ECC temporary buffer, the ECC unit containing checking means that create a check datum from the data for each ECC check width and compare the check datum with the stored additional datum, as is carried out, e.g., in means 106. Also included are checking means 108 for the margin read which, for the selected memory cell of the respective word line, ascertain a present charge state or read out the data using a modified threshold. Included as a fault reaction capability are interrupt means that trigger an interrupt, as depicted here at 110, in the event the check datum and the additional datum are not equal and/or in the event the present charge state reaches or falls below the definable charge threshold.

With the method and the apparatus according to the present invention, in the context of an electronic control system for controlling operational sequences, in particular in a vehicle but also in other devices or units, a check of the entire memory region, i.e., all the memory cells, can therefore be carried out in a short time before startup, so that on the one hand cyclic checking is possible in particular before every start, and on the other hand all memory cells can be checked, thus achieving increased reliability with no detriment to convenience.

What is claimed is:

1. A method for monitoring an electronic control system, comprising:
    storing at least one of control commands and data as code in at least one memory;
    transferring the code, in a context of ongoing instruction accesses, via a word line out of the at least one memory to a control unit having a specific word width, the word width encompassing the code of a plurality of memory cells of the memory, an additional datum being created in each case for the code of a word width and being stored in the memory;
    checking an entire code of the at least one memory outside the ongoing instruction accesses by selecting exactly one memory cell for each word width, a complete word line being activated thereby;
    creating a check datum from code of the complete word line; and
    comparing the check datum with the stored additional datum;
    wherein the checking, creating, and comparing are performed by an ECC unit.

2. The method as recited in claim 1, wherein the control unit is a precursor for controlling operating sequences.

3. The method as recited in claim 1, wherein the word width corresponds to one ECC check word width, so that the ECC check word width encompasses the code of the plurality of memory cells of the memory.

4. The method as recited in claim 3, wherein the ECC check word width corresponds to a multiple of one read word width of the control unit.

5. The method as recited in claim 3, wherein for each request of the control unit for the contents of a memory cell of the memory, the ECC unit is automatically filled to a complete ECC check word width, including the additional datum, and wherein the check datum is created from code of the complete ECC check word width and is compared with the additional datum.

6. The method as recited in claim 1, wherein for the selected memory cell, a present charge state is ascertained and is compared with a definable charge threshold.

7. The method as recited in claim 3, wherein for the selected memory cell, the code is read out at a definable charge threshold, and the correctness of the code is checked by the ECC unit by comparison with the charge threshold.

8. The method as recited in claim 1, wherein the selection of the memory cell is accomplished by repeatedly setting an increment proceeding from a start address of a first memory cell, each memory cell being selected at the spacing of the increment.

9. The method as recited in claim 8, wherein the word width corresponds to one ECC check word width, so that the ECC check word width encompasses the code of the plurality of memory cells of the memory; and
    wherein a defined increment corresponding to the ECC check word width is repeatedly added on beginning with the start address, and the corresponding memory cells are selected.

10. The method as recited in claim 1, wherein in an event the check datum and the additional datum are not identical, an interrupt is triggered and a fault is indicated.

11. The method as recited in claim 1, wherein in an event the check datum and the additional datum are not identical, a fault is detected and is corrected in accordance with the additional datum.

12. The method as recited in clam 6, wherein when the present charge state reaches or falls below the definable charge threshold, a refresh of the charge state of at least one of: i) the selected memory cell, ii) all the memory cells of the word width, or iii) all the memory cells of the memory, is carried out.

13. The method as recited in claim 6, wherein when the charge state reaches or falls below the definable charge threshold, a future fault is detected and that future fault is indicated.

14. An apparatus for monitoring an electronic control system, at least one of control commands and data being stored as code in at least one memory, the code being transferred, in a context of ongoing instruction accesses, via a word line out of the at least one memory to a control unit having a specific word width, the control unit including a processor for controlling operating sequences, the word width encompassing code of a plurality of memory cells of the memory, and an additional datum being created in each case for the code of a word width and being stored in the memory, the apparatus for monitoring comprising:
    a first arrangement configured to, outside the ongoing instruction accesses, check an entire code of the at least one memory by selecting for each word width exactly one memory cell to thereby activate a complete word line; and
    a checking arrangement configured to create a check datum the code of the complete word line and to compare the check datum with the stored additional datum.

15. The apparatus as recited in claim 14, wherein the first arrangement and the checking arrangement are included in an ECC unit.

16. The apparatus as recited in claim 14, further comprising:
   a charge checking arrangement configured to ascertain a present charge state for the selected memory cell and compare the present charge state with a definable charge threshold.

17. The apparatus as recited in claim 16, further comprising:
   an interrupt arrangement configured to trigger an interrupt at least one of: i) in an event the check datum and the additional datum are not identical, and ii) in an event the present charge state reaches or falls below the definable charge threshold.

18. The apparatus as recited in claim 16, further comprising:
   an indicating arrangement configured to indicate a fault at least one of: i) in an event the check datum and the additional datum are not identical, and ii) in an event the present charge state reaches or falls below the definable charge threshold.

* * * * *